United States Patent
Yanagihara et al.

(10) Patent No.: US 10,281,287 B2
(45) Date of Patent: May 7, 2019

(54) ROUTE GENERATION DEVICE AND ROUTE GENERATION METHOD

(71) Applicant: TOYOTA JIDOSHA KABUSHIKI KAISHA, Toyota-shi, Aichi (JP)

(72) Inventors: Tadashi Yanagihara, Moriya (JP); Sayaka Yoshizu, Kawasaki (JP); Kenji Horiguchi, Tokyo (JP); Chihiro Sannomiya, Yokohama (JP); Toshiro Hikita, Tokyo (JP); Teruhide Hayashida, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 61 days.

(21) Appl. No.: 15/124,380

(22) PCT Filed: Apr. 22, 2015

(86) PCT No.: PCT/JP2015/002177
§ 371 (c)(1),
(2) Date: Sep. 8, 2016

(87) PCT Pub. No.: WO2015/162915
PCT Pub. Date: Oct. 29, 2015

(65) Prior Publication Data
US 2017/0122753 A1 May 4, 2017

(30) Foreign Application Priority Data
Apr. 22, 2014 (JP) .................... 2014-088309

(51) Int. Cl.
*G01C 21/34* (2006.01)
*G01C 21/36* (2006.01)

(52) U.S. Cl.
CPC ........ *G01C 21/34* (2013.01); *G01C 21/3484* (2013.01); *G01C 21/3617* (2013.01)

(58) Field of Classification Search
None
See application file for complete search history.

(56) References Cited

U.S. PATENT DOCUMENTS 9,310,214 B1* 4/2016 Tzamaloukas .......... G01C 21/32
9,709,416 B2* 7/2017 Mizuno ................ G09B 29/106
(Continued)

FOREIGN PATENT DOCUMENTS

JP 2007-010571 A 1/2007
JP 2009-270877 A 11/2009
(Continued)

*Primary Examiner* — Thomas G Black
*Assistant Examiner* — Demetra R Smith-Stewart
(74) *Attorney, Agent, or Firm* — Oliff PLC

(57) ABSTRACT

A route generation device configured to generate a travel route of a traveling body that travels through a network configured of a node and a link, the route generation device includes a route model storage unit configured to store a route model that is data in which a frequency of travel through each link by the traveling body in a past trip performed by the traveling body is classified by destination of the trip; a trip acquisition unit configured to acquire a route starting point and a destination of a traveling body; and a route generation unit configured to extract a set of links corresponding to the acquired destination from the route model, and generate at least a part of a route of the traveling body from the route starting point to the destination based on the travel frequency associated with the extracted link.

13 Claims, 12 Drawing Sheets

(56) References Cited

U.S. PATENT DOCUMENTS

| | | | |
|---|---|---|---|
| 2001/0004725 A1* | 6/2001 | Yagyu | G01C 21/3484 |
| | | | 701/425 |
| 2007/0005240 A1 | 1/2007 | Oumi et al. | |
| 2010/0106414 A1 | 4/2010 | Whitehead | |
| 2013/0197797 A1* | 8/2013 | Boddy | G01C 21/20 |
| | | | 701/424 |
| 2013/0345977 A1* | 12/2013 | Shimizu | G01C 21/34 |
| | | | 701/533 |
| 2015/0300836 A1* | 10/2015 | Mizuno | G09B 29/106 |
| | | | 701/533 |

FOREIGN PATENT DOCUMENTS

| | | |
|---|---|---|
| JP | 2010-249642 A | 11/2010 |
| JP | 2010-267000 A | 11/2010 |
| JP | 2014-006437 A | 1/2014 |

\* cited by examiner

TRIP DATA TABLE

| | ORIGIN | DESTINATION | LINK SEQUENCE | DATE AND TIME OF DEPARTURE | DATE AND TIME OF ARRIVAL |
|---|---|---|---|---|---|
| TRIP 1 | A | D | AB,BC,CD | 2014/4/1 12:00 | 2014/4/1 13:00 |
| TRIP 2 | A | D | AB,BF,FD | 2014/4/2 12:00 | 2014/4/2 13:00 |
| TRIP 3 | A | D | AB,BE,EF,FD | 2014/4/3 12:00 | 2014/4/3 13:00 |
| TRIP 4 | B | D | BE,EC,CD | 2014/4/4 12:00 | 2014/4/4 13:00 |
| TRIP 5 | E | D | EF,FD | 2014/4/5 12:00 | 2014/4/5 13:00 |
| TRIP 6 | E | D | EF,FD | 2014/4/6 12:00 | 2014/4/6 13:00 |
| TRIP 7 | E | D | EC,CF,FD | 2014/4/7 12:00 | 2014/4/7 13:00 |
| TRIP 8 | A | F | AB,BE,EF | 2014/4/8 12:00 | 2014/4/8 13:00 |
| TRIP 9 | B | F | BE,EF | 2014/4/9 12:00 | 2014/4/9 13:00 |
| ... | | | | | |

FIG. 3

FREQUENCY TABLE

|  |  | DEPARTURE NODE | | | | | |
|---|---|---|---|---|---|---|---|
|  |  | A | B | C | D | E | F |
| ARRIVAL NODE | A | – | 0 | 0 | 0 | 0 | 0 |
|  | B | 1 | – | 0 | 0 | 0 | 0 |
|  | C | 0 | 1 | – | 0 | 0 | 0 |
|  | D | 0 | 0 | 1 | – | 0 | 0 |
|  | E | 0 | 0 | 0 | 0 | – | 0 |
|  | F | 0 | 0 | 0 | 0 | 0 | – |

FIG. 4A

FREQUENCY TABLE

|  |  | DEPARTURE NODE | | | | | |
|---|---|---|---|---|---|---|---|
|  |  | A | B | C | D | E | F |
| ARRIVAL NODE | A | – | 0 | 0 | 0 | 0 | 0 |
|  | B | 3 | – | 0 | 0 | 0 | 0 |
|  | C | 0 | 1 | – | 0 | 2 | 0 |
|  | D | 0 | 0 | 2 | – | 0 | 5 |
|  | E | 0 | 2 | 0 | 0 | – | 0 |
|  | F | 0 | 1 | 1 | 0 | 3 | – |

FIG. 4B

FREQUENCY TABLE

|  |  | DEPARTURE NODE | | | | | |
|---|---|---|---|---|---|---|---|
|  |  | A | B | C | D | E | F |
| ARRIVAL NODE | A | – | 0 | 0 | 0 | 0 | 0 |
|  | B | 1 | – | 0 | 0 | 0 | 0 |
|  | C | 0 | 0 | – | 0 | 0 | 0 |
|  | D | 0 | 0 | 0 | – | 0 | 0 |
|  | E | 0 | 2 | 0 | 0 | – | 0 |
|  | F | 0 | 0 | 0 | 0 | 2 | – |

FIG. 4C

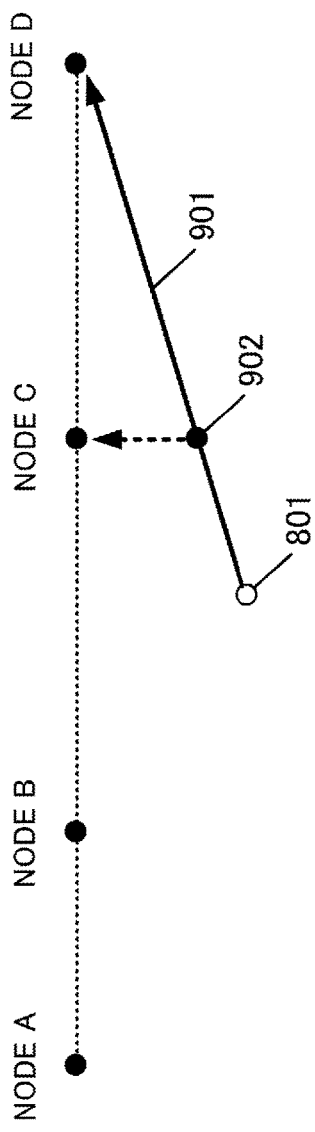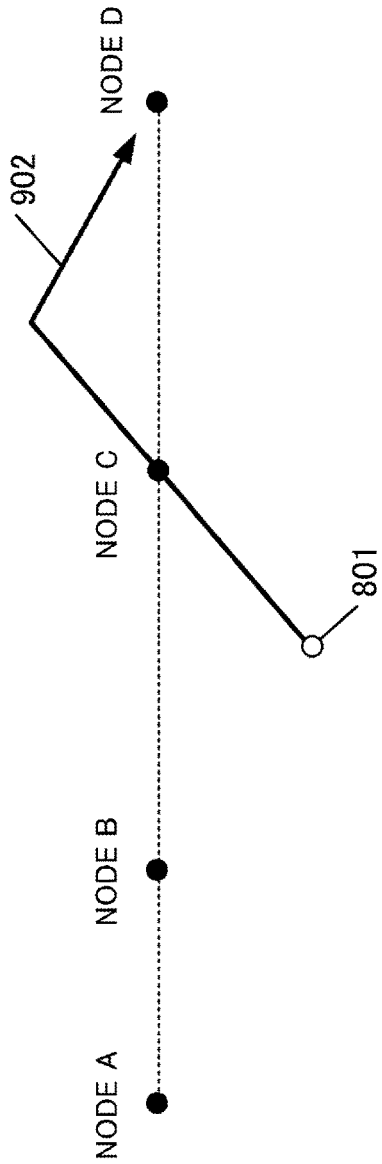
FIG. 9A
FIG. 9B

TRIP DATA TABLE

| | ORIGIN | DESTINATION | LINK SEQUENCE | DATE AND TIME OF DEPARTURE | DATE AND TIME OF ARRIVAL |
|---|---|---|---|---|---|
| TRIP 1 | A | D | AB,BC,CD | 2014/4/1 12:00 | 2014/4/1 13:00 |
| TRIP 2 | A | D | AB,BC,CF,FD | 2014/4/2 12:00 | 2014/4/2 13:00 |
| TRIP 3 | E | D | EC,CD | 2014/4/5 12:00 | 2014/4/5 13:00 |
| TRIP 4 | E | D | EF,FD | 2014/4/6 12:00 | 2014/4/6 13:00 |

FIG. 10A

FREQUENCY TABLE

| | | DEPARTURE NODE | | | | | |
|---|---|---|---|---|---|---|---|
| | | A | C | D | E | F |
| ARRIVAL NODE | A | – | 0 | 0 | 0 | 0 |
| | C | 2 | – | 0 | 1 | 0 |
| | D | 0 | 2 | – | 0 | 2 |
| | E | 0 | 0 | 0 | – | 0 |
| | F | 0 | 1 | 0 | 1 | – |

FIG. 10B

TRIP EXTRACTED FROM TRIP DATA TABLE

| ORIGIN | DESTINATION | LINK SEQUENCE | TIME PERIOD | DAY OF WEEK |
|---|---|---|---|---|
| A | D | AB,BC,CD | BETWEEN 9 AND 10 AM | SATURDAY |

FIG. 13A

DATA INPUT TO IDENTIFIER

| ORIGIN | DESTINATION | TIME PERIOD | DAY OF WEEK |
|---|---|---|---|
| A | AB | BETWEEN 9 AND 10 AM | SATURDAY |
| A | BC | BETWEEN 9 AND 10 AM | SATURDAY |
| A | CD | BETWEEN 9 AND 10 AM | SATURDAY |

FIG. 13B

ROUTE GENERATION DEVICE AND ROUTE GENERATION METHOD

TECHNICAL FIELD

The present invention relates to a device configured to generate a travel route of a traveling body.

BACKGROUND ART

In the field of mobile computing, a technique of searching for an optimal travel route based on an origin and a destination has become widespread. The optimal travel route is generally a route in which the cost for travel becomes minimum, e.g., a route with the shortest required time.

Meanwhile, there have been demands to search for a route according to the liking of a user. For example, Patent Literature 1 describes a navigation device configured to search for an optimal route from an origin to a destination using a cost evaluation function, wherein the device changes the weight coefficient of a cost parameter in accordance with the situation of driving (e.g., the day of week or time period). By using the device, a route in accordance with the characteristics of each user can be determined, such that, for example, a route with the shortest required time is selected on a weekday and a route that is easy to drive is selected on a holiday.

CITATION LIST

Patent Literature

[Patent Literature 1] Japanese Patent Application Laid-open No. 2007-10571

SUMMARY OF INVENTION

In an invention described above, a plurality of cost tables are held, a cost table to be used is determined in accordance with the situation such as the day of week or date and time and the preference of a user, and a route with the highest score is determined as an optimal route. Accordingly, an operation such as, for example, "search for a route including a road with a large road width as a low cost route with respect to a user A driving on a weekday" becomes possible.

Meanwhile, there have been demands to prioritize a familiar road, even if the cost is somewhat high, upon driving of a vehicle by a user. That is, there are tendencies for drivers to select different roads, regardless of the overall cost.

However, with the invention described above, weighting is performed only with respect to an entire route, without performing weighting with respect to a portion (link) of a route. Therefore, even a familiar road near the route is not selected as a route, unless the entire cost becomes the lowest. That is, there have been cases where a route in accordance with the tendency of a user cannot necessarily be determined.

The present invention has been made in consideration of a task described above, and an object is to provide a technique of generating a travel route in accordance with the tendency of a user in a route generation device configured to generate a travel route of a traveling body.

The route generation device according to the present invention is a device configured to generate a travel route of a traveling body that travels through a network configured of a node and a link Specifically, the present invention in its one aspect provides a route generation device configured to generate a travel route of a traveling body that travels through a network configured of a node and a link, the route generation device comprises a route model storage unit configured to store a route model that is data in which a frequency of travel through each link by the traveling body in a past trip performed by the traveling body is classified by destination of the trip; a trip acquisition unit configured to acquire a route starting point and a destination of a traveling body; and a route generation unit configured to extract a set of links corresponding to the acquired destination from the route model, and generate at least a part of a route of the traveling body from the route starting point to the destination based on the travel frequency associated with the extracted link A traveling body is an object that travels through a network (e.g., a road network) configured of a node and a link, and is a vehicle such as an automobile or bicycle. However, any form is acceptable, as long as traveling is based on the will of a human. For example, a human being himself is acceptable.

A route model is data in which a record of past travel by a traveling body is held by destination in the format of travel frequency for each link For example, in the case where travel from node A to node B has occurred three times in the past, the relationship of a pair of a departure node and an arrival node (node A to node B) and the number of travels (three times) is held. That is, a route model is a set of links for reaching a certain destination node, and is data in which the travel frequency is associated with each link As long as a value represents the frequency of travel through a link by a traveling body or a value is calculated based on the frequency, the travel frequency may be the number of times or may be the rate (probability) of the link being selected by the traveling body at an adjacent diverging point, for example.

A route starting point is the starting point for generating a route. A trip acquisition unit is a unit configured to acquire the route starting point and a destination of a traveling body. The route starting point and the destination can be acquired by any method. For example, a current position of a traveling body may be acquired and defined as the route starting point, or the destination may be estimated based on a record of past travel by the traveling body. Alternatively, the route starting point and the destination may be specified based on an input operation performed by a person (e.g., a user of a device or a driver).

A route generation unit is a unit configured to generate a route based on a route model. Specifically, a set of links corresponding to an acquired destination is extracted from the route model, the travel frequency associated with the link is referenced, and a travel route with a route starting point as the starting point is determined.

With the configuration, a route more in accordance with the liking of a driver can be obtained, since the route is generated based on the frequency of past travel through a link by a traveling body.

The route generation unit may generate the route of the traveling body by tracing, from the route starting point, a link of which the travel frequency is maximum out of links corresponding to a travel target node that is one segment ahead.

Also, the route generation unit may generate the route of the traveling body by acquiring, for each segment formed of N (N>=2) links, a link sequence for which a total of travel frequency of the link sequence becomes maximum in the segment.

The data extracted by the route generation unit is a set of links for reaching the designated destination. With the route generation unit, a link sequence with a higher travel frequency is extracted from the set of links and defined as a predicted route.

Herein, there are a plurality of approaches to a method of extracting a link sequence. One is a method of simply tracing each segment of a link with the highest travel frequency with the route starting point as the starting point. When the method is used, the route can be determined with a small amount of calculation.

In the case where a link is traced from the route starting point in view of only the travel frequency of a link corresponding to a node that is one segment ahead, there are cases where an obtained route is not necessarily an optimal route. Thus, the route may be divided at every N segments (i.e., N links where N is 2 or greater), and a link sequence of which the total of respective travel frequencies become maximum may be searched for and defined as a part of the route. A value of N may differ for each segment.

The route generation device may further comprise a merging route acquisition unit configured to acquire a merging route connecting the route starting point and any of points included in the extracted set of links, in a case where a link including the route starting point does not exist in the extracted set of links, wherein the route generation unit may generate a route with a starting point at an end of the merging route.

In the case where the route starting point for determining a route is not included in the extracted set of links, generation of a route cannot be performed directly. In such a case, a method can be taken in which a route (merging route) connecting the route starting point and any of points included in the extracted set of links is generated, and then a route is determined with a starting point at the end (i.e., point of merging) of the merging route.

The merging route may be any route, as long as the route connects the route starting point and any of the points included in the extracted set of links. For example, a route in which the distance of the route starting point and the point of merging becomes minimum is acceptable. Obviously, the merging route may be acquired with other methods.

The merging route acquisition unit may acquire a second route connecting the route starting point and the destination acquired by the trip acquisition unit, and in a case where the second route merges or intersects with any of the points included in the extracted set of links, may define a route connecting the route starting point and the point of merging or intersection, as a merging route.

In this manner, in the case where there is a separate route (second route) connecting the route starting point and the destination and the second route intersects with any of points included in the extracted set of links, a route connecting the route starting point and the point of intersection may be defined as the merging route. The second route may be, for example, a route in which the travel distance becomes minimum or may be a route in which other travel costs become minimum. Such a route may be acquired from an external device (e.g., navigation device).

The merging route acquisition unit may acquire a second route connecting the route starting point and the destination acquired by the trip acquisition unit, may extract a diverging point, on the second route, where a distance to any of the points included in the extracted set of links is less than or equal to a predetermined distance, and may define a route that extends from the route starting point to the point included in the extracted link via the diverging point, as a merging route.

In the case where the second route does not intersect with any of the points included in the extracted set of links, it is necessary to cause merging at some point. Thus, in the case where the second route has approached any of the points included in the extracted set of links to a predetermined distance or less, a route may be caused to diverge and merge at the point. Accordingly, a route can be merged in a natural form.

The trip acquisition unit may acquire a current position of the traveling body and defines the acquired position as a route starting point.

The route starting point may be input by a user or may be acquired automatically by the device. For example, in the case where position information of the traveling body is acquirable, a current position may be defined as the route starting point.

The route generation device may further comprise a past route acquisition unit configured to acquire past route data that is data in which a route in a past trip of the traveling body is represented by a sequence of links included in the trip; and a route model generation unit configured to generate the route model based on the past route data, and store the route model in the route model storage unit.

In this manner, past trip data of the traveling body may be collected to generate a route model. With the configuration, a more accurate route prediction can be performed, since a route can be predicted based on a past travel record.

The route model generation unit may extract a point where a plurality of routes included in the past route data intersect with each other, may define the extracted point as a virtual node, and may generate the route model using an origin, a destination, and the virtual node.

Normally, a node refers to a point where a route diverges. However, in the case where a network in question is a road, the volume of a route model increases dramatically when the number of points where a road diverges increases. In order to prevent this, a process of omitting an unnecessary node may be added upon generating a route model.

Specifically, a point where pieces of past trip data intersect is extracted, the extracted point is defined as a virtual node, and a route model is generated using the virtual node, aside from an origin and a destination. That is, a point not used as a diverging point in a past trip is not deemed as a node for constructing a route model, even if included in past route data.

With the configuration, the volume of a route model can be reduced, since a node unnecessary for prediction of a route can be omitted.

The route generation device may further comprise a destination estimation unit configured to estimate a destination of the traveling body based on a link sequence included in the past route data.

In the case where the past route data is referable, a point to which travel is most likely may be estimated as the destination based on the data.

The destination estimation unit may include an identifier, may perform learning by inputting, to the identifier, a destination corresponding to the link sequence and a plurality of pieces of position information on the link sequence, and may estimate the destination by inputting position information of the traveling body to the identifier.

For example, by causing the identifier to learn a destination corresponding to a link sequence included in the past route data and a plurality of pieces of position information on the link sequence as learning data, an identifier that outputs a destination when position information is input can be obtained. By estimating a destination with such a method, the estimation precision of a destination can be enhanced.

The present invention can be specified as a route generation device including at least a part of the units described above. It can also be specified as a route generation method executed by the route generation device. It can also be specified as a route model generation device configured to generate a route model. The process or unit described above can be freely combined for implementation, as long as a technical contradiction does not occur.

With the present invention, a travel route in accordance with the tendency of a user can be generated in a route generation device configured to generate a travel route of a traveling body.

BRIEF DESCRIPTION OF DRAWINGS

FIG. 3 is an example of a trip data table in the first embodiment.

FIGS. 4A to 4C are examples of a frequency table in the first embodiment.

FIGS. 9A and 9B are views showing an example of generating a merging route in a third embodiment.

FIGS. 10A and 10B are examples of a trip data table and a frequency table in a fourth embodiment.

FIGS. 13A and 13B are views illustrating learning of an identifier in the fifth embodiment.

DESCRIPTION OF EMBODIMENTS (First Embodiment)
<System Configuration>

A preferred embodiment of the present invention will be described below with reference to the drawings.

Figure 1:
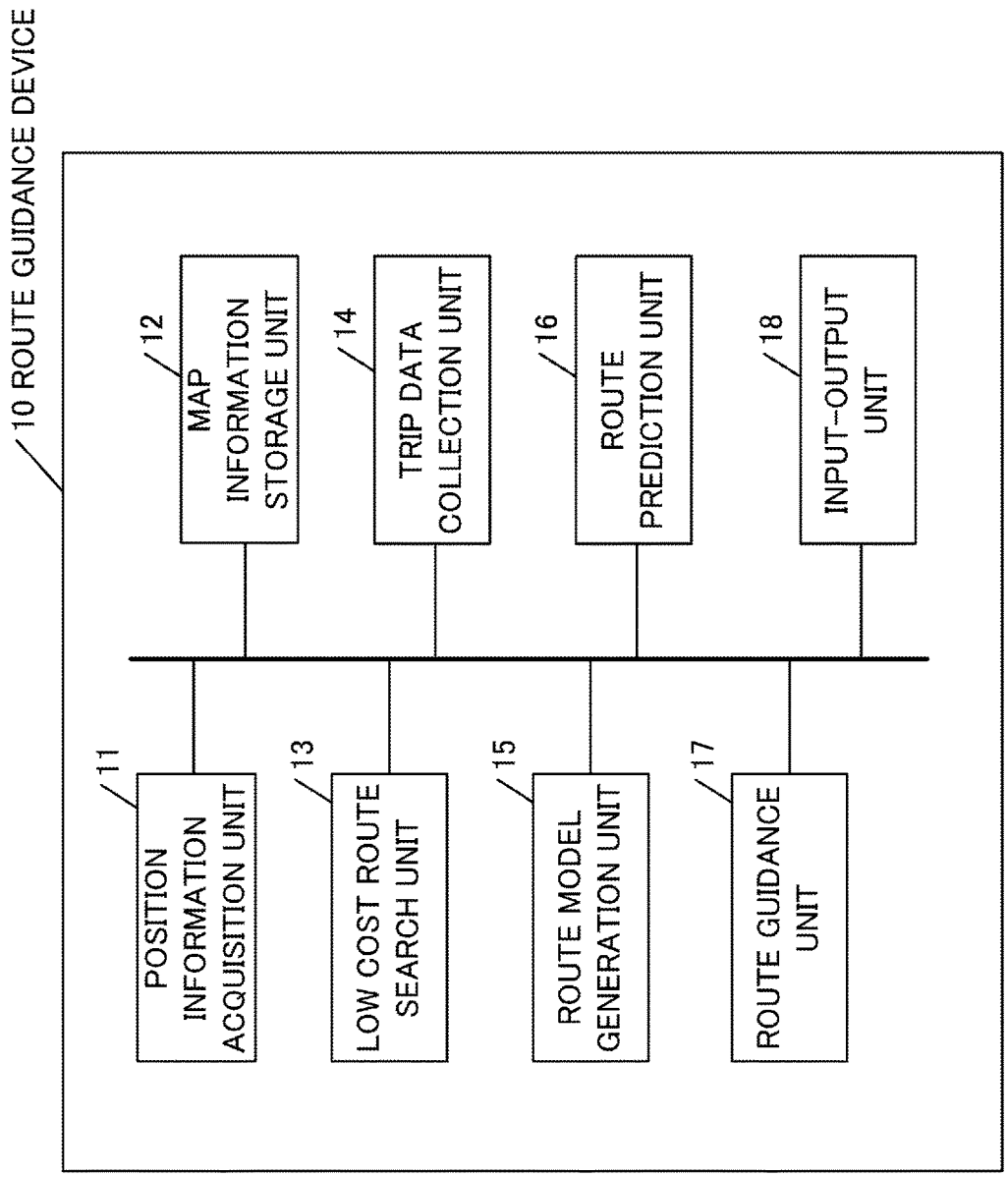
FIG. 1 is a system configuration diagram of a route guidance device according to a first embodiment.

A route guidance device according to a first embodiment is a vehicle navigation device having a function of generating and providing a driver with a route connecting an origin and a destination. In generating a route, there are two modes of a conventional guidance mode to search for a route based on the travel cost and a guidance mode peculiar to this embodiment to determine an optimal route based on past driving of a corresponding vehicle. The latter mode is a mode in which a route likely to be selected by the driver in the future is predicted to perform route guidance. Therefore, the term "route prediction" instead of "route search" is used to give a description. FIG. 1 is a system configuration diagram of a route guidance device 10 according to this embodiment.

First, the route guidance device 10 will be described. The route guidance device 10 is configured of a position information acquisition unit 11, a map information storage unit 12, a low cost route search unit 13, a trip data collection unit 14, a route model generation unit 15, a route prediction unit 16, a route guidance unit 17, and an input-output unit 18.

The position information acquisition unit 11 is a unit configured to acquire current position information (latitude and longitude) from a GPS device (not shown) provided to the device.

Figure 2:
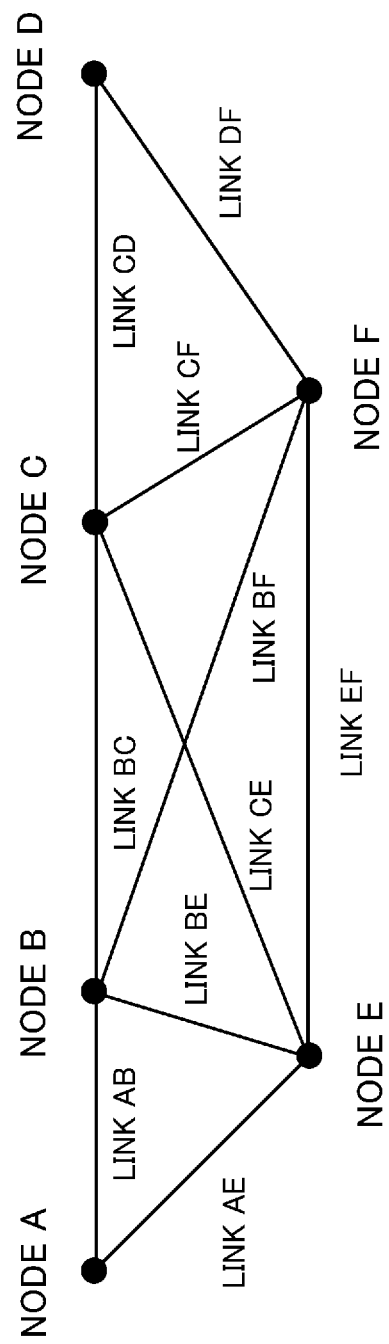
FIG. 2 is an example in which a road network is represented by a node and a link

The map information storage unit 12 is a unit configured to store map information. The map information is typically road map data in which information on a road that can be taken by a vehicle is defined. In this embodiment, data in which the connection relationship of roads is expressed with a link and a node is used. FIG. 2 is an example in which the connection relationship of roads is represented by a node and a link The map information includes information (e.g., the distance or travel time) relating to cost upon travel by a vehicle, in addition to the connection relationship of roads as shown in FIG. 2.

In this embodiment, a node and a link are specified using a node ID (e.g., node A) and a link ID (e.g., link AB) as shown in FIG. 2. A different link ID is used depending on the travel direction, even for the same link For example, link AB represents a link from node A toward node B, and link BA represents a link from node B toward node A. Although a single link ID is shown in FIG. 2, two link IDs are assigned to each link The low cost route search unit 13 is a unit configured to search for a route in which the travel cost becomes minimum, based on the map information stored in the map information storage unit 12. Specifically, information on a current position (i.e., origin) from the position information acquisition unit 11 and information on a destination from a user through the input-output unit 18 described later are acquired to search for a route connecting the two points. The low cost route search unit 13 is a unit configured to perform a route search using a known algorithm.

The trip data collection unit 14 is a unit configured to collect and accumulate routes taken by a vehicle mounting the route guidance device 10. That is, the unit is configured to store the history of routes taken by the vehicle in the past. Hereinafter, a route connecting an origin and a destination is referred to as a trip. By performing driving using the route guidance device 10 according to this embodiment, a route that has actually been taken in addition to an origin and a destination can be acquired in the form of a set of links. The trip data collection unit 14 stores the set of links actually taken by the vehicle together with the origin and the destination.

The route model generation unit 15 is a unit configured to construct a model (hereinafter, route model) for determining a route, based on trip data collected by the trip data collection unit 14.

The route prediction unit 16 is a unit configured to generate a route connecting an origin and a destination, using a constructed route model. The route prediction unit 16 differs from the low cost route search unit 13 in that a route is determined using a route model instead of cost associated with a link A user of the device can select which one to use in determining a route.

A specific data structure and method of construction of a route model as well as specific content of processing performed by the route prediction unit 16 will be described later.

The route guidance unit 17 is a unit configured to provide a user with a route searched for by the low cost route search unit 13 or a route predicted by the route prediction unit 16. Specifically, a route obtained as a set of links is replaced into a format such as map information that can be provided to a user and is provided through the input-output unit 18 described later.

The input-output unit 18 is a unit configured to accept an input operation performed by a user and present information to the user. Specifically, the configuration includes a touch panel, a control unit therefor, a liquid crystal display, and a control unit therefor. The touch panel and the liquid crystal display is formed of one touch panel display in this embodiment.

Control of each unit described above is realized by a control program being executed by a processing device (not shown) such as a CPU. This function may be realized by a field-programmable gate array (FPGA), application specific integrated circuit (ASIC), or the like or may be realized by a combination thereof. It may be realized by dedicated hardware.

<Collection of Trip Data>

Processing performed by the route guidance device 10 according to this embodiment can be mainly divided into three parts of a process of collecting trip data, a process of generating a route model, and a process of generating a route based on the route model. The outline of each process will be described.

First, the process of collecting trip data will be described.

Upon detecting that driving of a vehicle has started, the trip data collection unit 14 acquires position information periodically from the position information acquisition unit 11, references map information stored in the map information storage unit 12, and then specifies a link taken by the vehicle. For example, in the case where a vehicle that has departed from node A has arrived at node D via node B and node C, a link sequence of three that is link AB, link BC, and link CD are generated.

Whether or not the vehicle is on a trip can be determined by monitoring the state of an engine, for example. For example, it may be determined as a start of driving in the case where the engine has been started and determined as an arrival at a destination in the case where the engine has stopped. Even in the case where the engine has stopped, it may be determined as a continuation of the trip in the case of a restart within a predetermined time. Whether or not the vehicle is on a trip can be determined by any known method.

When the trip of the vehicle ends, the trip data collection unit 14 stores a link sequence corresponding to the trip. FIG. 3 is an example of data (trip data) collected by the trip data collection unit 14. Each record of trip data is added every time a trip occurs. For example, a record of trip 2 represents that the vehicle has taken a route from origin A along link AB, link BF, and link FD to destination D.

<Generation of Route Model>

Next, the process of generating a route model that is information representing the frequency of travel through a link by a vehicle based on accumulated trip data will be described. The process is executed by the route model generation unit 15. An example of a route model in this embodiment will be described with reference to FIG. 4A. A route model in this embodiment is a table representing the frequency of travel of a vehicle between certain nodes and is a table generated for each destination. The table is referred to as a frequency table. A set of frequency tables is a route model.

A table shown in FIG. 4A is a frequency table corresponding to "destination: node D." In FIG. 4, a destination node is shown with a black background.

A "departure node" defined in the frequency table is not an origin of a vehicle but a travel source node upon travel between nodes by the vehicle. In a similar manner, an "arrival node" is not an arrival point of the vehicle but a travel target node upon travel between nodes by the vehicle. A numerical value shown at an intersection of respective nodes is the number of times (travel frequency) of travel by the vehicle in the past trough a corresponding link For example, it is assumed that the vehicle has traveled a route from node A along node B and node C to node D. Herein, a total of three travels of "node A to B," "node B to C," and "node C to D" have occurred. In the first travel, the departure node is A, and the arrival node is B. In a similar manner, in the second travel, the departure node is B, and the arrival node is C. In the third travel, the departure node is C, and the arrival node is D. When the travels are reflected in the frequency table, the numerical values shown at the intersections of the departure nodes and the arrival nodes are respectively incremented, resulting in the state shown in FIG. 4A.

FIG. 4A is an example in which a single trip has been reflected. However, even in the case of reflecting a plurality of trips, the number of travels through a corresponding link is incremented every time a travel through a link occurs, in a similar manner. For example, in the case where seven trips of trip 1 to trip 7 out of trip data shown in FIG. 3 have been reflected, the frequency table is as shown in FIG. 4B.

With the route model generation unit 15, trip data collected by the trip data collection unit 14 is read and reflected in a frequency table for each destination by the process described above.

In the case where a destination is new, a new frequency table is generated. In the example in FIG. 3, there is a trip (trips 8 and 9) in which the destination is node F. Therefore, in the case where a corresponding record has been read, a corresponding frequency table is generated, and the number of travels is recorded by a similar process. For example, a frequency table reflecting trip 8 and trip 9 (frequency table in which the destination is node F) is as shown in FIG. 4C.

In this manner, the route model generation unit 15 reads trip data periodically and constructs a route model.

Upon reading trip data, an existing route model may be discarded for regeneration, or only unprocessed trip data may be read and added. A process of deleting trip data that has become older by a certain time or more may be added.

<Route Generation Based on Route Model>

Next, the process of generating a route using a route model generated by the route model generation unit 15 with the route prediction unit 16 will be described.

In order to generate a route using a route model, an origin (route starting point) and a destination first need to be determined. In this embodiment, the origin and the destination are input by a user through the input-output unit 18. A current position acquired by the position information acquisition unit 11 may be used as the origin. Alternatively, the origin and the destination may be acquired or estimated using any known method.

When the origin and the destination are determined, the route prediction unit 16 extracts a frequency table corresponding to the corresponding destination from a route model generated by the route model generation unit 15. Herein, it is assumed that the destination is node D, and the frequency table shown in FIG. 4B has been extracted.

When the frequency table is acquired, the route prediction unit 16 first specifies a node or link corresponding to the origin (route starting point) of a vehicle. Herein, it is assumed that the origin of the vehicle is on link AB. Next, a link sequence up to the destination is acquired by tracing links with the maximum number of travels in order out of routes included in the frequency table (i.e., a plurality of routes connecting link AB and node D). That is, a link sequence of link AB (3), link BE (2), link EF (3), and link FD (5) can be acquired. (The number of travels recorded in the frequency table is shown within parenthesis.) A route determined in this manner is a preferable route that is familiar to a driver driving the vehicle.

<Process Flowchart>

Next, a process flowchart for realizing the function described above will be described.

Figure 5:
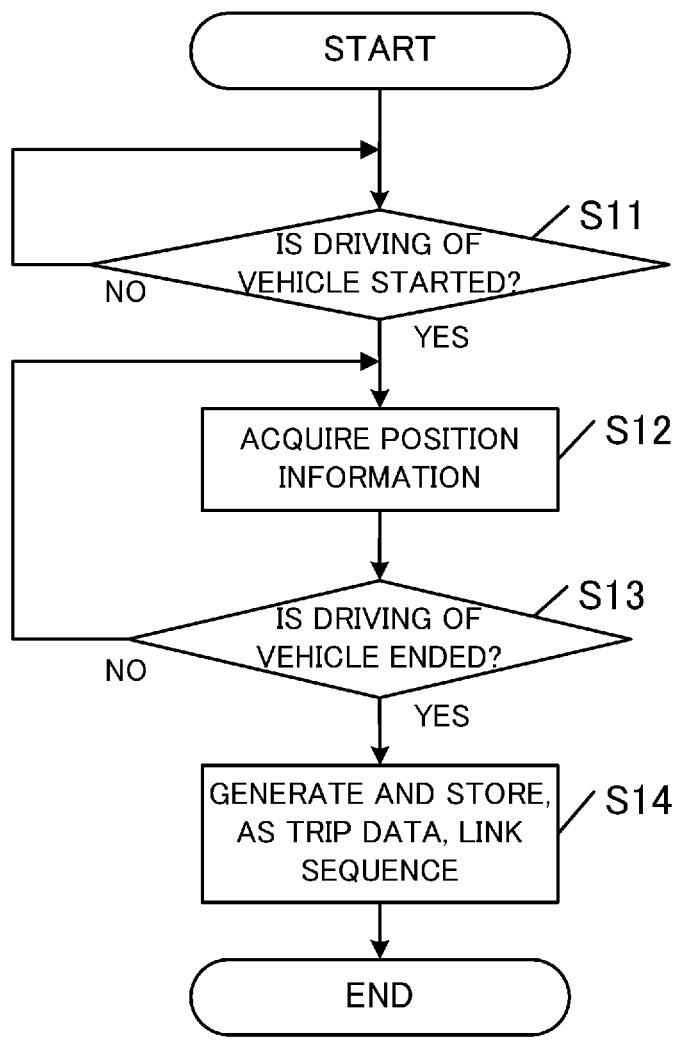
FIG. 5 is a flowchart of a trip data collection process in the first embodiment.

FIG. 5 is a flowchart of the process of collecting trip data. The process is executed periodically by the trip data collection unit 14.

First, in step S11, whether or not driving of a vehicle has started is determined. Whether or not driving of the vehicle has started may be determined by acquiring, for example, the state of an engine as described above or may be determined using other data (e.g., vehicle speed). In the case where driving of the vehicle is not started, it waits until a start. In the case where driving has been started, it shifts to step S12 to start recording of a route.

In step S12, position information of the vehicle is acquired from the position information acquisition unit 11, map information stored in the map information storage unit 12 is referenced, and then a link taken by the vehicle is specified. In the case where the vehicle is in a link already specified, the process is caused to shift to step S13. In the case of entrance into a new link, a link ID corresponding to the link is added to the route, and then the process is caused to shift to step S13.

In step S13, whether or not driving of the vehicle has ended is determined. In the case where driving of the vehicle is not ended, it waits for a predetermined time, and then the process is caused to shift to step S12.

In the case where it has been determined that driving of the vehicle has ended, a link sequence formed of a plurality of acquired link IDs is generated, and a record is added to a trip data table in step S14.

Figure 6:
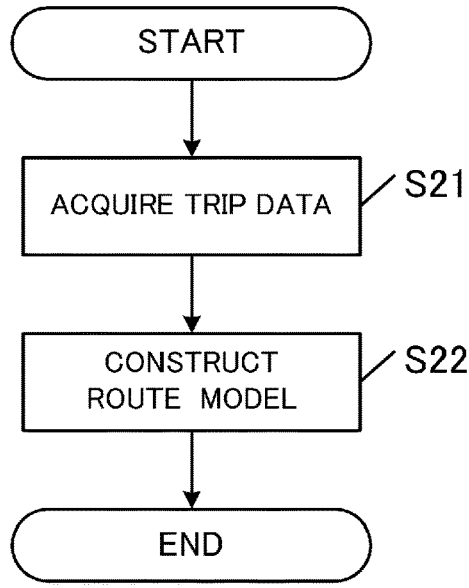
FIG. 6 is a flowchart of a route model construction process in the first embodiment.

FIG. 6 is a flowchart of the process of constructing a route model with the route model generation unit 15 based on stored trip data. The process can be implemented at any timing, such as with a predetermined period or predetermined schedule. For example, a new trip may be acquired from the trip data collection unit 14 to perform the process every day at a regular time, or an engine may be stopped to perform the process, at a timing when a trip has been generated, using the trip.

First, in step S21, trip data recorded in the trip data collection unit 14 is acquired. In step S22, a route model is constructed with the method described above.

Figure 7:
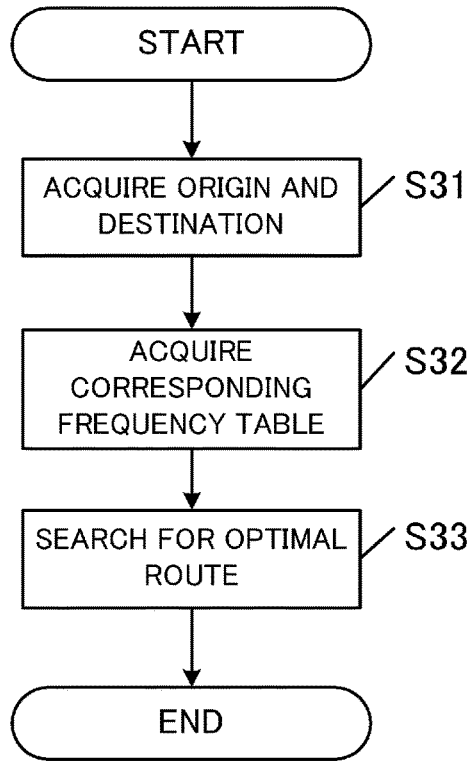
FIG. 7 is a flowchart of a route prediction process in the first embodiment.

FIG. 7 is a flowchart of a process of determining an optimal route for a driver, based on a stored route model. The process is started based on an operation by a user and executed by the route prediction unit 16.

First, in step S31, an origin and a destination are acquired. As described above, the origin and the destination may be designated by the user, or an estimated one may be used in the case where one or both can be estimated. For example, input of the origin and the destination may be accepted through the input-output unit 18, or, in the case where information can be acquired from another instrument, the information may be used. Position information of a vehicle may be acquired from the position information acquisition unit 11 to be used as the origin.

Next, in step S32, a frequency table corresponding to the destination acquired in step S31 is acquired.

Next, in step S33, a route is searched for with the method described above using the acquired frequency table. The search result of a route is output to the route guidance unit 17 in the format of a link sequence, and the route guidance unit 17 presents the user with the information through the input-output unit 18. For example, image data of a road map may be generated for an overlay display of the acquired route, or the route may be output with character information.

As described above, with route guidance device according to the first embodiment, a route connecting an origin and a destination is generated based on a past trip. Accordingly, a route including many links taken many times in the past can be acquired, and a more preferable route for a driver can be output.

(Second Embodiment)

In the first embodiment, a frequency table corresponding to a destination is acquired, and then a route connecting an origin and the destination is predicted. However, in the case where the origin of a vehicle does not exist in the corresponding frequency table, prediction of a route cannot be performed. A second embodiment is an embodiment that deals with this. The embodiment is such that, in the case where an origin node does not exist in a frequency table, a route up that reaches a point existing in the frequency table is generated and merged with the point existing in the frequency table.

Figure 8A:
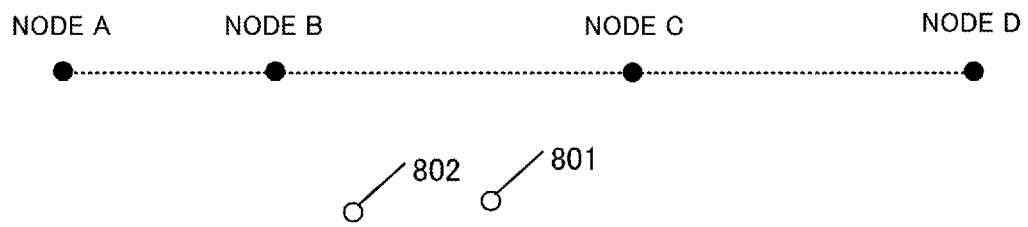
FIGS. 8A to 8C are views showing an example of generating a merging route in a second embodiment.

FIG. 8A is a view illustrating merging of a route. A dotted line is a link (omitted herein while only four nodes are shown in the drawing) existing in a frequency table. A place denoted by reference numeral 801 is a current position of a vehicle. In the case where the vehicle is in such a positional relationship, the vehicle has to be guided to any of nodes or links existing in the frequency table in order to generate a route.

Thus, in the second embodiment, a process described below is executed after executing step S32.

First, whether the current position of the vehicle is a position corresponding to a node or link included in the frequency table is determined. In the case where the current position of the vehicle is not a position corresponding to a node or link at this time, map information stored in the map information storage unit 12 is referenced, whether there is a route that reaches a node or link is determined, and a route (merging route in the present invention) used for merging is determined.

Figure 8B:
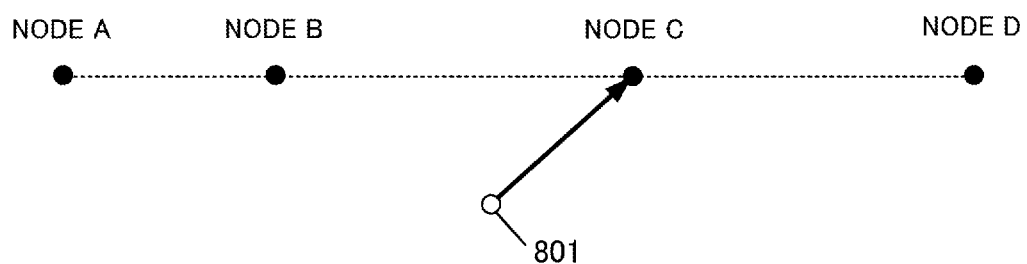
Figure 8C:
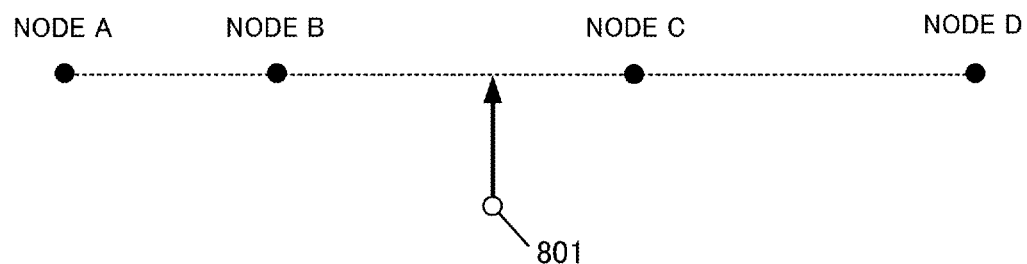

For example, the merging route may be a route that reaches the closest node out of nodes included in the frequency table or may be a route that reaches the closest link In the case of the former, the merging route is as shown in FIG. 8B. In the case of the latter, the merging route is as shown in FIG. 8C.

The merging route is preferably a route that reaches the closest node or link out of nodes or links included in the frequency table, but is not necessarily that toward the closest node or link For example, in the case where routing through the merging route is rather a detour as a whole, a route toward another node or link is acceptable. For example, in the case where the vehicle is in a place denoted by reference numeral 802, it may be toward node C that is second closest, instead of node B.

(Third Embodiment)

In the second embodiment, a merging route for merging with a link existing in a frequency table has been generated.

In the case where a route connecting an origin and a destination (e.g., route calculated based on travel cost or hereinafter second route) is already obtained, there are cases where merging with a link existing in a frequency table while using the route is more advisable. A third embodiment is an embodiment that deals with this.

FIGS. 9A and 9B are views illustrating merging of a route in the third embodiment. Reference numeral 901 in FIG. 9A denotes the second route. The second route is, for example, a route searched for by the low cost route search unit 13 and is, for example, a route in which the required time or driving distance becomes minimum.

In the third embodiment, two methods are given regarding a method of merging a route while using the second route.

One is a method in which, in the case where there is a point (diverging point in the present invention) where the distance to a node or link existing in a frequency table is less than or equal to a threshold, the diverging point and the node or link are connected. In an example in FIG. 9A, a route connecting a point 902 and node C is generated and defined as a part of a merging route.

The other is a method in which, in the case where the second route intersects with a node or link existing in a frequency table, merging is caused at a corresponding point of intersection. In this case, a route connecting reference numeral 801 and node C is a merging route.

In this manner, with the third embodiment, a route calculated based on the frequency can be merged while using a route calculated by another unit (e.g., unit configured to calculate a route based on cost).

(Fourth Embodiment)

In the first to third embodiments, a route model has been generated based on trip data. Since the trip data is generated using information on a node and link stored in the map information storage unit 12, the generated route model is also based on the information on the node and link stored in the map information storage unit 12.

In the case where all parts where a road diverges are treated as a node in a road network, there is a problem that the data volume becomes huge. For example, in the case where there are 100 nodes within a network, the size of a frequency table is 100 x 100. Further, since frequency tables exist by destination, the data volume increases explosively when the number of nodes increases.

To deal with this, a fourth embodiment is an embodiment in which a virtual node and link, instead of a node and link defined in map information, are used to generate a frequency table. Since there are two realization methods in this embodiment, each one will be described.

A first method is a method in which an unnecessary node is omitted upon constructing a route model, and then a virtual link is provided.

For example, upon constructing a route model in step S22, presence of a node where diverging has not occurred is detected, and a frequency table is generated with the node being omitted.

Herein, it is assumed that the content of trip data in the network in FIG. 2 is as shown in FIG. 10A. In this case, it is meaningless for node B to be held in a frequency table, since diverging has not occurred at node B. Thus, node B is omitted, and a frequency table as shown in FIG. 10B is generated. That is, driving through link AB and link BC is represented by a virtual link that is link AC.

A route predicted by the route prediction unit 16 becomes a route in which the unnecessary node has been omitted. Therefore, upon guidance of a route by the route guidance unit 17, the route may be complemented with the node and presented to a user.

In the case where diverging has newly occurred at the omitted node, it suffices to reconstruct a route model.

Figure 11:
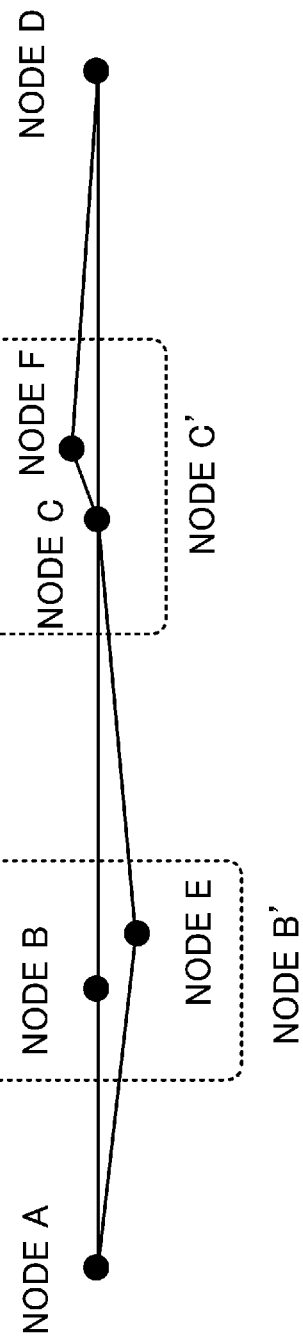
FIG. 11 is an example of a node and a link in the fourth embodiment.

A second method is a method in which a plurality of routes that can be deemed as substantially the same are integrated into one route upon constructing a route model. FIG. 11 is a view illustrating integration of routes.

In the first to third embodiments, a case where driving of a vehicle has been through a route from node A along node B and node C to node D and a case where driving of a vehicle has been through a route from node A along node E and node C to node D are treated as different routes, for example. However, even if route nodes actually differ, there are cases where routes can be deemed the same, in the case where the difference is minute.

In order to deal with this, nodes (links) for which the difference can be deemed as minute are replaced with one virtual node (link) in the second method, upon constructing a route model in step S22. In an example in FIG. 11, node B and node E are defined as one virtual node B', and node C and node F are defined as one virtual node C', for example. As a result, four routes connecting node A and node D are all treated as a single route through link AB', link B'C', and link CD. A frequency table is generated also using a virtual node (link)

In this manner, in the fourth embodiment, the data volume of a frequency table can be reduced by generating a frequency table using a virtual node and link The first method and the second method described above may be used in combination.

(Fifth Embodiment)

In the first to fourth embodiments, a destination has been determined based on an input by a user. In contrast, a fifth embodiment is an embodiment in which a destination is automatically estimated based on accumulated trip data.

Figure 12:
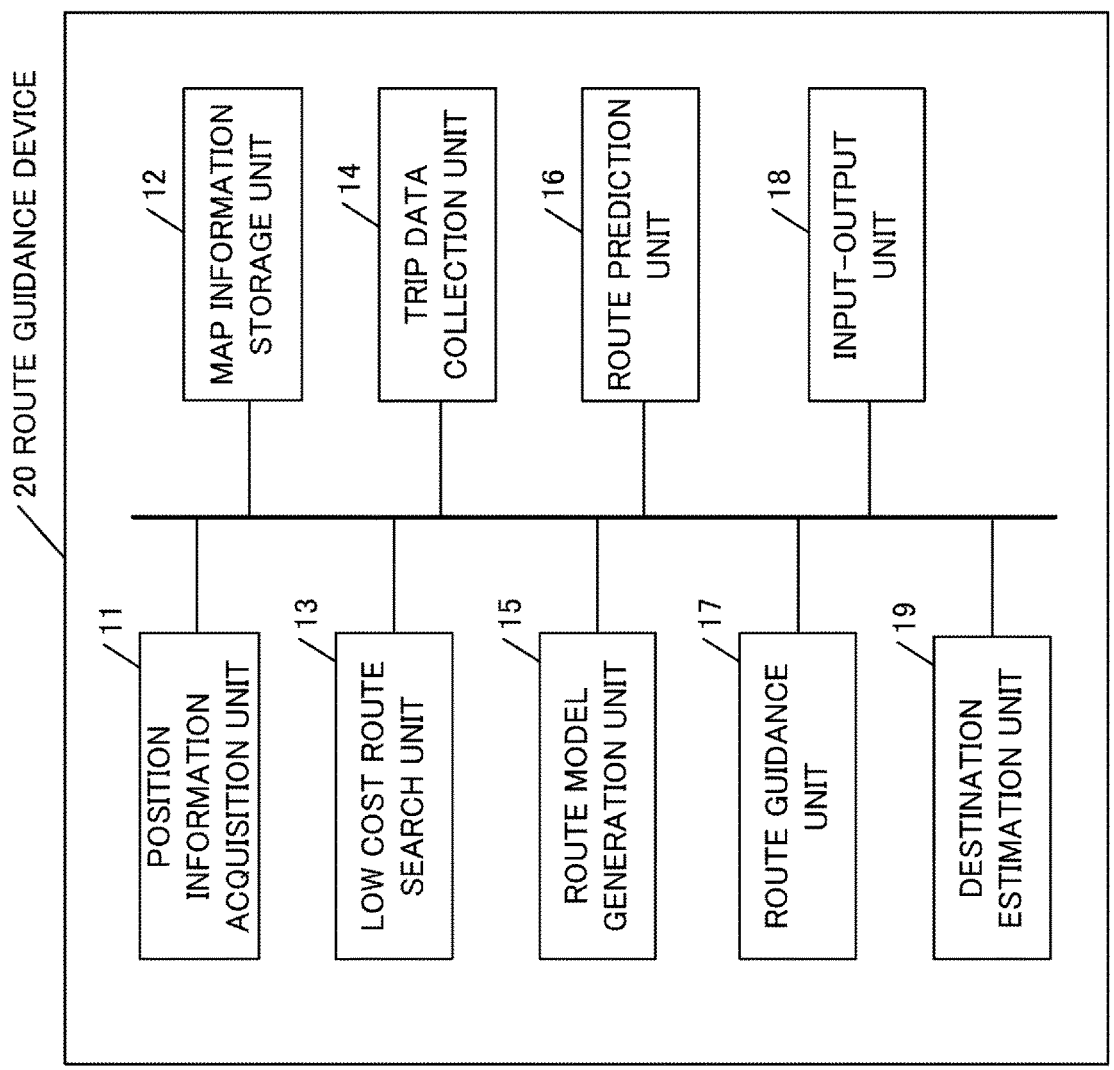
FIG. 12 is a system configuration diagram of a route guidance device in a fifth embodiment.

FIG. 12 is a system configuration diagram of a route guidance device 20 according to the fifth embodiment. The route guidance device 20 according to the fifth embodiment differs from the route guidance device 10 according to the first embodiment in that a destination estimation unit 19 that is a unit configured to estimate a destination based on trip data is included.

The destination estimation unit 19 will be described in detail. The destination estimation unit 19 contains an identifier and is a unit configured to estimate a destination of a vehicle based on past trip data. Specifically, two phases of a learning phase in which learning is performed using past trip data and an evaluation phase in which, at a timing when driving of the vehicle has started, an estimated destination is acquired with information relating to the driving as an input are executed. For the identifier included in the destination estimation unit 19, a naive Bayes classifier can be used, for example. Other identifiers are also acceptable.

First, the learning phase performed by the destination estimation unit 19 will be described.

The learning phase can be implemented at any timing, such as with a predetermined period or predetermined schedule. For example, a new trip may be acquired from the trip data collection unit 14 to perform learning every day at a regular time, or an engine may be stopped to perform learning, at a timing when a trip has been generated, using the trip.

In the case of performing learning, the destination estimation unit 19 extracts each record of a trip from the trip data collection unit 14 to acquire an origin, destination, day of week, time period, and link sequence. The day of week and the time period are the day of week and the time period in which the trip has been started. Herein, it is assumed that data shown in FIG. 13A has been acquired from a trip data table. The time period and the day of week are acquired from a "date and time of departure" field.

Next, the acquired data is decomposed for each link into a format shown in FIG. 13B, and the data is input to the identifier and learned as learning data corresponding to "destination."

Next, the evaluation phase performed by the destination estimation unit 19 will be described.

The evaluation phase is executed at a timing when estimation of a destination is desired. For example, a timing when an engine has been started is acceptable. In the case of estimating a destination, a current position of a host vehicle is input to the identifier, in addition to an origin, a time period, and the day of week. For example, in the case where the host vehicle is on link AB, link AB is defined as the current position. The destination output in this manner is an estimated destination of the vehicle.

The estimated destination may be transmitted to the low cost route search unit 13 or the route prediction unit 16, for example. Accordingly, generation of a route can be started without a user designating a destination.

In a conventional destination estimation method using an identifier, learning and evaluation have been performed using only information such as an origin or a time period (the day of week). Therefore, estimation with high precision has been unable to be performed. In contrast, in the fifth embodiment, the destination is estimated by inputting a current position using a link taken by a vehicle that has departed from a certain origin as a part of learning data. Since there is a strong association between the current position and the destination, the destination can accordingly be estimated more precisely.

Even in the case where a destination has been estimated once, a destination may be estimated again during travel of a vehicle. In the case where an estimated destination has changed, a route may be generated again. Accordingly, the precision of an estimated destination increases as a destination is approached. As a result, an effect that the precision of a predicted route increases can be obtained.

(Modified Example)

The embodiment described above is merely one example. The present invention can be appropriately changed without departing from the gist thereof.

For example, in the respective embodiments, the route guidance device 10 is a device mounted to a vehicle. However, implementation can be with a mobile terminal, software that runs on a mobile terminal, or the like. The route guidance device may be a server device that communicates with a traveling body via a network. It may be such that a part of components of the route guidance device 10 is arranged on the server side, and other components are arranged on the traveling body side. For example, only the position information acquisition unit 11 and the input-output unit 18 may be arranged on the traveling body side.

In the respective embodiments, a route model has been constructed using a frequency table by destination. However, a route model may be constructed in other formats, as long as the travel frequency of a link that corresponds to a certain destination can be defined. For example, a method in which a table for a current position is held by destination, a table corresponding to the next travel node within the table is further held, and the travel frequency is finally held is acceptable.

A value defined as the travel frequency may be not necessarily a value representing the number of past travels. For example, a normalized value is acceptable, or that added with a correction value to obtain a smooth overall distribution is acceptable. As a method of correction, there is Laplace smoothing or Good-Turing smoothing, for example.

In the respective embodiments, a route has been generated by tracing a link with the maximum travel frequency from an origin to a destination. However, it suffices that a generated route be at least a part of a route connecting an origin and a destination using a frequency table.

In the respective embodiments, a predicted route has been generated by tracing each segment of a link with the maximum travel frequency from an origin to a destination. However, a predicted route may be generated using other methods, as long as the basis is the travel frequency associated with a link For example, a predicted route may be obtained by searching for a route, for each segment configured of two or more link sequences, in which the total of the number of travels of the link sequence becomes maximum.

In the respective embodiments, a frequency table corresponding to a vehicle has been generated. However, a frequency table may be generated for each driver. Accordingly, an optimal route for each driver can be generated.

This application claims the benefit of Japanese Patent Application No. 2014-088309, filed on Apr. 22, 2014, which is hereby incorporated by reference herein in its entirety.

REFERENCE SIGNS LIST

10: Route guidance device
11: Position information acquisition unit
12: Map information storage unit
13: Low cost route search unit
14: Trip data collection unit
15: Route model generation unit
16: Route prediction unit
17: Route guidance unit
18: Input-output unit

The invention claimed is:

1. A route generation device configured to generate a travel route of a traveling body that travels through a network having a node and a link, the route generation device comprising:
   a memory storing a route model that: (i) classifies a frequency of travel through each link by the traveling body based on destinations reached by the traveling body in at least one past trip performed by the traveling body, (ii) identifies a number of times the traveling body has visited each link in the at least one past trip, and (iii) identifies a destination for a given trip by the traveling body; and
   a processor operatively coupled to the memory, the processor being programmed to:
      acquire a route starting point and a destination of a traveling body,
      extract a set of links corresponding to the acquired destination from the route model, and
      generate at least a part of a route of the traveling body from the route starting point to the destination based on the travel frequency associated with the extracted link.

2. The route generation device according to claim 1, wherein the processor generates the route of the traveling body by tracing, from the route starting point, a link of which the travel frequency is maximum out of links corresponding to a travel target node that is one segment ahead.

3. The route generation device according to claim 1, wherein the processor generates the route of the traveling body by acquiring, for each segment formed of N (N>=2) links, a link sequence for which a total of travel frequency of the link sequence becomes maximum in the segment.

4. The route generation device according to claim 1, wherein the processor is further programmed to:
acquire a merging route connecting the route starting point and any of points included in the extracted set of links, in a case where a link including the route starting point does not exist in the extracted set of links, and
generate a route with a starting point at an end of the merging route.

5. The route generation device according to claim 4, wherein the processor is further programmed to:
acquire a second route connecting the acquired route starting point and the acquired destination, and
in a case where the second route merges or intersects with any of the points included in the extracted set of links, define a route connecting the route starting point and the point of merging or intersection, as a merging route.

6. The route generation device according to claim 4, wherein the processor is further programmed to:
acquire a second route connecting the acquired route starting point and the acquired destination,
extract a diverging point, on the second route, where a distance to any of the points included in the extracted set of links is less than or equal to a predetermined distance, and
define a route, which extends from the route starting point to the point included in the extracted link via the diverging point, as a merging route.

7. The route generation device according to claim 1, wherein the processor acquires a current position of the traveling body and defines the acquired position as a route starting point.

8. The route generation device according to claim 1, wherein the processor is further programmed to:
acquire past route data that is data in which a route in a past trip of the traveling body is represented by a sequence of links included in the trip; and
generate the route model based on the past route data, and store the route model in the memory.

9. The route generation device according to claim 8, wherein the processor is further programmed to:
extract a point where a plurality of routes included in the past route data intersect with each other,
define the extracted point as a virtual node, and
generate the route model using an origin, a destination, and the virtual node.

10. The route generation device according to claim 8, wherein the processor estimates a destination of the traveling body based on a link sequence included in the past route data.

11. The route generation device according to claim 10, wherein the processor is further programmed to:
provide an identifier,
perform learning by inputting, to the identifier, a destination corresponding to the link sequence and a plurality of pieces of position information on the link sequence, and
estimate the destination by inputting position information of the traveling body to the identifier.

12. A route generation method performed by a route generation device configured to generate a travel route of a traveling body that travels through a network configured of a node and a link, the route generation method comprising:
acquiring, by a processor, a route starting point and a destination of a traveling body;
acquiring, by the processor, a route model that: (i) classifies a frequency of travel through each link by the traveling body based on destinations reached by the traveling body in a past trip performed by the traveling body, (ii) identifies a number of times the traveling body has visited each link in the at least one past trip, and (iii) identifies a destination for a given trip by the traveling body;
extracting, by the processor, a set of links corresponding to the acquired destination from the route model; and
generating, by the processor, at least a part of a route of the traveling body from the route starting point to the destination based on the travel frequency associated with the extracted link.

13. A route model generation device configured to generate a route model for generating a travel route of a traveling body that travels through a network configured of a node and a link, the route model generation device comprising:
a processor programmed to:
acquire past route data that is data in which a route in a past trip of the traveling body is represented by a sequence of links included in the trip; and
generate a route model that: (i) classifies a frequency of travel through each link by the traveling body based on destinations reached by the traveling body identified in the acquired past route data, (ii) identifies a number of times the traveling body has visited each link in the at least one past trip, and (iii) identifies a destination for a given trip by the traveling body.

* * * * *